United States Patent [19]

Satoh

[11] 4,245,904
[45] Jan. 20, 1981

[54] SLR MIRROR AND SHUTTER REBOUND PREVENTION MECHANISM

[75] Inventor: Mitsuo Satoh, Tokyo, Japan

[73] Assignee: Asahi Kogaku Kogyo Kabushiki Kaisha, Tokyo, Japan

[21] Appl. No.: 60,105

[22] Filed: Jul. 24, 1979

[30] Foreign Application Priority Data

Aug. 25, 1978 [JP] Japan .................. 53/117218[U]

[51] Int. Cl.³ ............... G03B 19/12; G03B 9/10
[52] U.S. Cl. ............... 354/153; 354/156; 354/252
[58] Field of Search ............... 354/152–153, 354/156, 252, 261–265

[56] References Cited

U.S. PATENT DOCUMENTS 3,882,523  5/1975  Uno et al. ............... 354/156
4,003,066  1/1977  Shono ............... 354/152

*Primary Examiner*—L. T. Hix
*Assistant Examiner*—Thomas H. Tarcza
*Attorney, Agent, or Firm*—Sughrue, Rothwell, Mion, Zinn and Macpeak

[57] ABSTRACT

A mirror and shutter rebound preventing mechanism in a lens shutter type single-lens reflex camera having a shutter release lever for preliminarily closing a shutter. A shutter blade release ring with a release ring pin follows the shutter release lever and a shutter rebound prevention lever follows the release ring pin. A mirror lifting plate includes pins to drive the two levers. The mirror lifting plate drives the shutter release lever and shutter bound preventing lever before a mirror is lifted. The mirror lifting plate has a protrusion which holds the mirror when the mirror is lowered.

8 Claims, 11 Drawing Figures

SLR MIRROR AND SHUTTER REBOUND PREVENTION MECHANISM

BACKGROUND OF THE INVENTION

This invention relates to a mirror and shutter rebound prevention mechanism in a lens shutter type single-lens reflex camera.

In a focal plane shutter type single-lens reflex camera, bounce after the mirror is lowered may be disregarded because the shutter curtain is provided immediately in front of the film. However, if in a lens shutter type single-lens reflex camera, rebound is created when the mirror is lowered, or shutter blade rebound is caused when the shutter is preliminarily closed, then unwanted exposure occurs. Therefore, such movement must be prevented.

SUMMARY OF THE INVENTION

Accordingly, this invention provides a mirror and shutter rebound preventing mechanism which includes a mechanism in which as soon as a mirror lifting plate is restored, the mirror lifting plate and a mirror sheet are held to prevent the rebound of the mirror. Also, a mechanism is provided in which shutter rebound also is prevented by the operation of a shutter lock preventing lever caused by the mirror lifting plate.

This and other objects of this invention are accomplished by means of a mirror and shutter rebound preventing mechanism in a lens shutter type single-lens reflex camera. The mechanism comprises a shutter release lever for preliminarily closing a shutter. A shutter blade release ring with a release ring pin follows the shutter release lever. A shutter rebound preventing lever follows the release ring pin and a mirror lifting plate with drives the two levers with pins. The mirror lifting plate drives the shutter release lever and shutter rebound preventing lever before a mirror is lifted. The mirror lifting plate has a protrusion which holds the mirror when the mirror is lowered.

This invention will be described with respect to the drawings and the description of the preferred embodiment that follows.

BRIEF DESCRIPTION OF THE DRAWINGS

More specifically, FIG. 2 shows the state of the mechanism obtained before the winding operation is effected;

FIG. 4 shows the state of the mechanism obtained after the winding operation is effected;

FIG. 6 shows the state of the mechanism obtained immediately before the mirror is lifted;

FIG. 8 shows the state of the mechanism at the time of exposure;

FIG. 10 shows the state of the mechanism obtained immediately before the mirror is lowered;

DESCRIPTION OF THE PREFERRED EMBODIMENT

Figure 1:
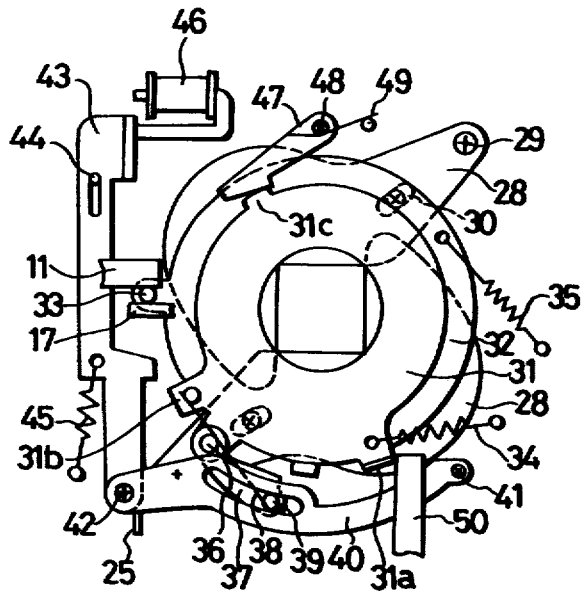
FIGS. 1, 3, 5, 7 and 9 are front views showing the various states of a shutter mechanism associated with the operations of the mechanism illustrated in FIGS. 2, 4, 6, 8 and 10, respectively.
Figure 2:
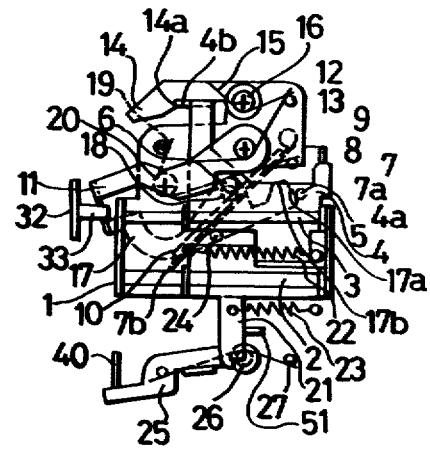
FIGS. 2, 4, 6, 8 and 10 are side views showing the various steps of operation of one example of a mirror and shutter rebound preventing mechanism according to this invention.

In FIGS. 1 and 2, reference numeral 1 designates main plates of the mechanism according to the invention which is mounted on the side of a mirror box. Elements 2 and 3 are shafts, both ends of each shaft being fixedly secured to the main plates 1. A lifting plate 4 lifts a mirror 10 when the shaft 3 is slid to the left. The lifting plate 4 has a pin 5 for preventing shutter rebound by turning a rebound preventing lever 17. A drive pin 6 closes the shutter by driving a shutter release lever 11 which normally maintains the shutter blades released by depressing a release annular pin 33.

A mirror sheet 7 has a bend portion 7a, and a pin 8 embedded therein. The pin 8 is adapted to lift the mirror 10 in cooperation with the cam 4a of the mirror lifting plate. A mirror sheet rotating shaft 9, shaft 12 of the shutter release lever 11, a release lever spring 13, a locking lever 14 for locking the bent portion 4b of the lifting plate 4 with its locking part 14a, a locking lever spring 15, and a locking lever shaft 16 are also shown in the figures.

Referring further to FIGS. 1 and 2, reference numeral 17 designates a rebound preventing lever operating in such a manner that, when the locking part 14a is disengaged from the bent portion 4b, the mirror lifting plate is slid to the left. As a consequence, the inclined part 17a and the protruding part 17b of the rebound preventing lever 17 are depressed by the pin 5, so that the lever 17 is turned clockwise to hold the release annular pin. This serves to prevent shutter rebound.

Figure 4:
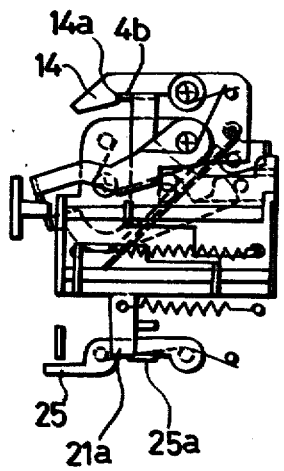

FIG. 2 also shows a rebound preventing lever shaft 18 and a spring 19 connected to the mirror lifting pin 8 to restore the mirror. A mirror lowering spring shaft 20 and a mirror restoring plate 21 slides along the shaft 2. Two springs, a mirror lifting spring 22 and a mirror restoring spring 23, are shown. A mirror restoring stopper pin 24 and a mirror restoring plate locking plate 25 has a bent portion 25a so that the bent portion 25a and the step 21a locking the restoring plate 21 is slid left by a mirror charge lever 51. (FIG. 4). The shaft 26 of the mirror restoring plate engages the locking lever 25 and is biased by a restoring plate locking lever spring 27. Shutter blades 28 serve also as aperture blades and are opened and closed by turning around shafts 29.

Figure 3:
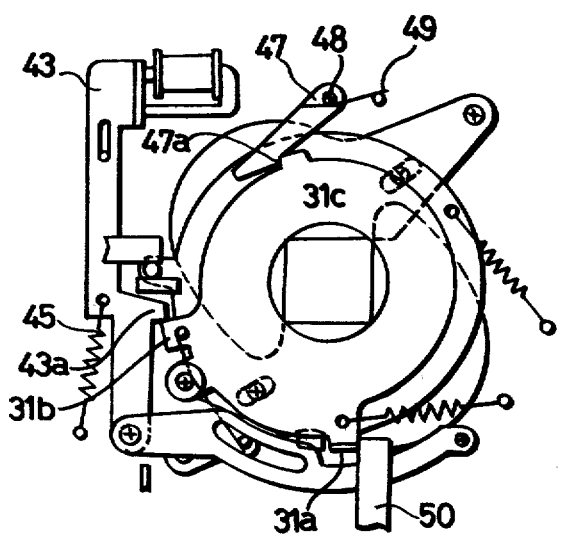

A set ring 31 shown in FIGS. 1, 3, etc, is turned clockwise through the bent portion by a shutter charge lever 50. As a result, the protrusion 31b pushes upwardly the protrusion 43a of an armature lever 43 so as to set the armature lever 43 at the operating position of an electromagnet 46. At the same time, the locking section 31c of the set ring 31 is locked, and therefore the set ring 31 is also locked. This is shown in FIG. 3.

Referring still further to the figures, reference numeral 32 designates a release ring for opening and closing the shutter blades 28. The release ring 32 has pins 30 embedded therein to engage the elongated holes of the shutter blades 28. Element 33 is a release ring pin and element 34, a set ring restoring spring coupled to protrusion 31a. A release ring restoring spring 35 is coupled to the release ring 32. A release ring holding lever shaft 36 supports a release ring holding lever 37 in a rotatable manner over the set ring 31.

A pin 39 is embedded in the lever 37 and the lever 37 is energized by a spring 38 to turn counterclockwise. The pin 39 is inserted into a groove formed in a control lever 40 which is pivotally supported by a shaft 41. The holding part 37a of the release ring holding lever 37 is designed to hold the protrusion 32a of the release ring 32.

Still referring to FIGS. 1 and 2, reference numeral 42 designates a connecting pin between the control lever 40 and the armature lever 43; 44, a guide pin engaging a slot in the armature lever and 45, an armature lever restoring spring. A lever 47 for locking the shutter set ring 31 contacts a locking lever shaft 48 with the shaft biased by a locking lever spring 49.

Now, the operation of the mechanism according to the invention will be described.

As the winding operation is carried out, the state of the mechanism is changed from that shown in FIGS. 1 and 2 to that shown in FIGS. 3 and 4. When the bent portion 31a is pushed to the left by the shutter charge lever 50, the shutter set ring 31 is turned clockwise, and the locking part 31c is locked by the set ring locking lever 47. At the same time, the protrusion 31b pushes the protrusion 43a upwardly and the armature lever 43 is set at the operating position. When the mirror charge lever 50 is moved to the left, the step 21a of the mirror restoring plate 21 is locked by the bent portion 25a of the restoring plate locking lever 25. The mirror lifting plate 4 is locked by the lifting plate locking lever 14 with the aid of the locking part 14a and the bent portion 4b.

Figure 5:
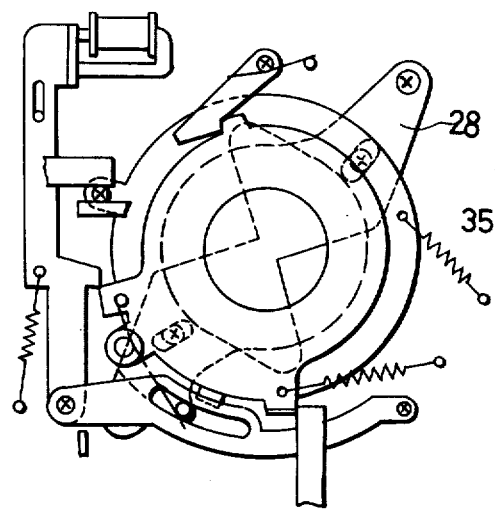
Figure 6:
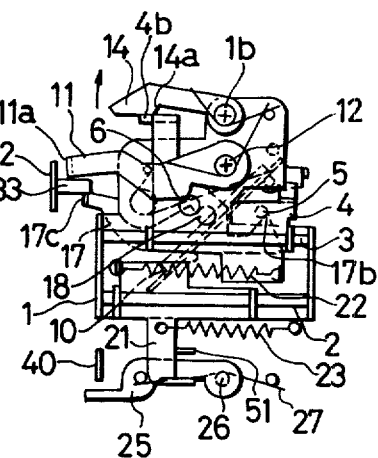
Figure 7:
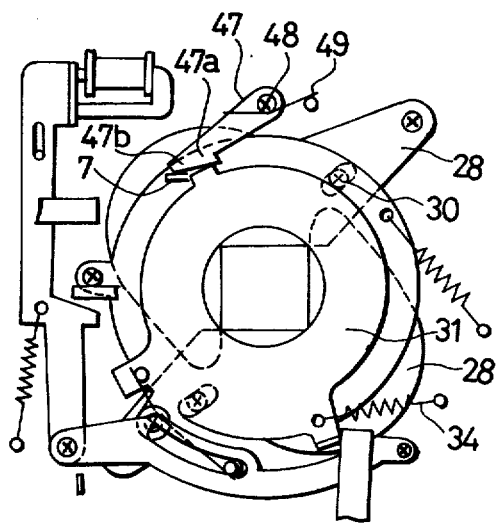

In association with the operation of the release button (FIGS. 5 and 6), the lifting plate locking lever 14 is turned clockwise around the shaft 16 and the bent portion 4b is disengaged from the locking part 14a. The mirror lifting plate 4 slides to the left by the spring 22 and the shutter release lever 11 is turned clockwise around the shaft 12 by the release lever operating pin 6. The release pin 33 embedded in the blade release ring 32 is released. As a result, the blade release ring 32 is turned clockwise by the release ring restoring spring 35. At the same time, the protrusion 17b is depressed by the lifting plate pin 5, and the rebound preventing lever 17 turns clockwise to cause its bent portion 17c to depress the pin 33 to prevent the release ring from being turned counterclockwise. Thus the device prevents shutter rebound.

Simultaneously, the motion of the lifting plate 4 causes the protrusion 4a to push the pin 8 upwardly to lift the mirror 10, and its end pushes upwardly the end part 47b of the locking lever 47 to disengage the end part 47b from the locking part 31c. As a result, the shutter set ring 31 is turned counterclockwise by the spring 34. The holding lever 37 pushes the protrusion 32a to turn the release ring 32 counterclockwise and the blades 28 are released through the blade pins 30.

Figure 8:
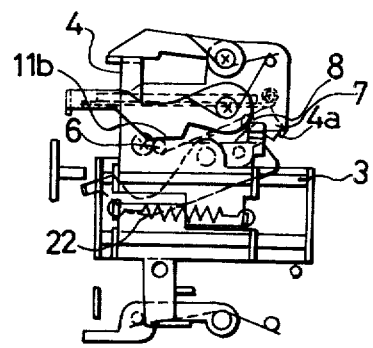

Under this condition, the lifting plate pin 5 has passed over the protrusion 17b, and therefore the rebound preventing lever 17 is set free. Accordingly, the downward movement of the pin 33, the counterclockwise turn of the release ring 32, and the release of the shutter blades 28 are not disturbed. (FIG. 8)

Figure 9:
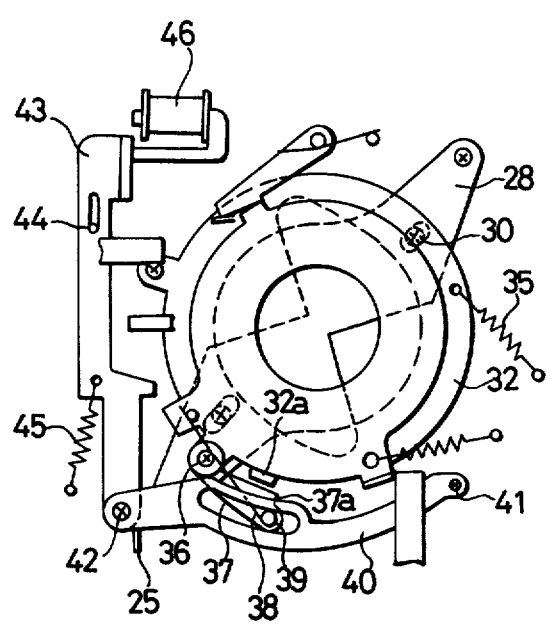
Figure 10:
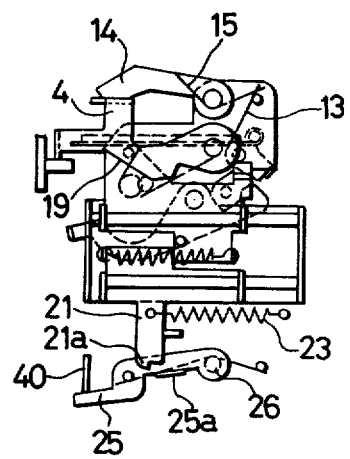
Figure 11:
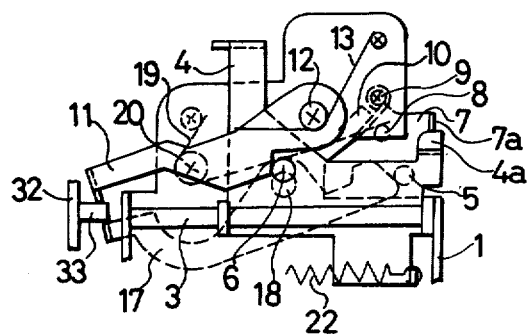
FIG. 11 is a side view showing the essential components of the mechanism according to the invention.

Then, when an exposure data control circuit detects a correct exposure data, the electromagnet 46 is deenergized. Therefore, the armature lever 43 is moved downwardly by the spring 45. At the same time, the control lever 40 is turned counterclockwise around the shaft 41 to push the pin 39 downwardly. As a result, the protrusion 32a is disengaged from the holding part 37a, the blade release ring 32 is turned clockwise by the spring 35 and the blades 28 are closed by the pins 30. Thus, the exposure is accomplished (FIG. 9).

Simultaneously, the control lever 40 is lowered, the locking lever 25 is turned around the shaft 26 and the step 21a is disengaged from the bent portion 25a. As a result, the mirror restoring plate 21 is restored as shown in FIG. 2 by the spring 23 and the mirror is restored by the mirror restoring spring 19 with the aid of the pin 8. In this operation, the bend portion 7a of the mirror sheet 7 is engaged with the protrusion 4a of the mirrror lifting plate 4 (FIG. 2) which prevents the mirror 10 from being turned clockwise or in the opposite direction, thus preventing the rebound of the mirror 10.

With the mechanism as described above, the rebound of the mirror and the shutter can be positively prevented. Thus, the mechanism according to the invention offers advantages for effectively operating the camera.

What is claimed is:

1. A mirror and shutter rebound preventing mechanism in a lens shutter type single-lens reflex camera comprising;

a shutter blade release ring having a release ring pin following said shutter release lever; a shutter rebound preventing lever following said release ring pin; a mirror lifting plate having pins for driving said shutter release lever and for driving said shutter rebound preventing lever, said mirror lifting plate driving said shutter release lever and shutter rebound preventing lever before a mirror is lifted, and said mirror lifting plate having a protrusion holding said mirror when said mirror is lowered.

2. The mechanism of claim 1 further comprising a cam surface on said mirror lifting plate, said mirror having a bent portion and a pin protruding from said bent portion, said pin engaging said cam surface.

3. The mechanism of claim 1 wherein said lifting plate has a bent portion, said mechanism further comprising a locking lever having a portion engaging the bent portion of said lifting plate and bias means to urge engagement of said portions.

4. The mechanism of claim 1 further comprising a plurality of shutter blades having holes, said shutter blade release ring further comprises a plurality of pin members engaging said holes in said shutter blades.

5. The mechanism of claims 1, 2, 3 or 4 further comprising a shutter charge lever, a set ring having a first protrusion engaging said shutter charge lever for rotating said set ring in one direction a second protrusion on said set ring forming a locking section, and a set ring locking lever engaging said second prortusion.

6. The mechanism of claim 5 further comprising an armature and an armature lever, said armature lever having a protruding notch, said set ring having a third protrusion engaging said protruding notch.

7. The mechanism of claim 5 further comprising bias means to urge said first protrusion into contact with said shutter charge lever.

8. The mechanism of claims 1, 2, 3, or 4 further comprising an armature and an armature lever, a control lever coupled to said armature lever, said control lever having a slot, a release ring holding lever coupled to said shutter blade release ring and having a protrusion engaging said slot.

* * * * *